United States Patent
Senger et al.

(10) Patent No.: US 7,077,783 B2
(45) Date of Patent: Jul. 18, 2006

(54) METHOD AND DEVICE FOR OPERATING A CLUTCH

(75) Inventors: Karl-Heinz Senger, Farmington Hills, MI (US); Peter Baeuerle, Ludwigsburg (DE); Bram Veenhuizen, ED Goirle (NL); Engbert Spijker, LG Helmond (NL); Gert-Jan Van Spijk, VT Drunen (NL)

(73) Assignee: Robert Bosch GmbH, Stuttgart (DE)

(*) Notice: Subject to any disclaimer, the term of this patent is extended or adjusted under 35 U.S.C. 154(b) by 98 days.

(21) Appl. No.: 10/130,242

(22) PCT Filed: Sep. 5, 2001

(86) PCT No.: PCT/DE01/03395
§ 371 (c)(1),
(2), (4) Date: Dec. 5, 2002

(87) PCT Pub. No.: WO02/23066
PCT Pub. Date: Mar. 21, 2002

(65) Prior Publication Data
US 2003/0134713 A1 Jul. 17, 2003

(30) Foreign Application Priority Data
Sep. 15, 2000 (DE) ............... 100 45 758

(51) Int. Cl.
F16H 59/64 (2006.01)

(52) U.S. Cl. .......... 477/98; 477/97; 477/176; 477/180; 192/70.12; 192/103 F; 192/103 R; 192/82 T; 701/67; 701/68

(58) Field of Classification Search ............ 477/98, 477/97, 174, 176, 180; 192/82 T, 70.12, 192/103 F, 103 R; 701/67, 68
See application file for complete search history.

(56) References Cited

U.S. PATENT DOCUMENTS

| | | | |
|---|---|---|---|
| 4,072,220 A | | 2/1978 | Hamada |
| 4,828,089 A | * | 5/1989 | Collins et al. ............ 192/70.12 |
| 4,856,380 A | * | 8/1989 | Murano et al. ................ 477/39 |
| 5,023,789 A | * | 6/1991 | Lampe et al. ................. 701/68 |
| 5,082,096 A | * | 1/1992 | Yamashita et al. .......... 477/175 |
| 5,261,295 A | * | 11/1993 | Iwanaga et al. ............. 477/98 |
| 5,307,269 A | * | 4/1994 | Kohno ....................... 701/68 |
| 5,322,150 A | | 6/1994 | Schmidt-Bruecken et al. |
| 5,403,250 A | | 4/1995 | Juergens |
| 5,611,752 A | * | 3/1997 | Kamada et al. ............. 477/98 |
| 5,630,773 A | * | 5/1997 | Slicker et al. ............. 477/176 |
| 5,674,155 A | * | 10/1997 | Otto et al. ................. 477/176 |
| 5,850,898 A | * | 12/1998 | Bohme et al. ............. 192/54.3 |
| 5,954,618 A | * | 9/1999 | Mikami et al. ............. 477/174 |
| 6,253,140 B1 | * | 6/2001 | Jain et al. ..................... 701/67 |
| 6,652,415 B1 | * | 11/2003 | Segawa et al. .............. 477/62 |

FOREIGN PATENT DOCUMENTS

| DE | 198 51 341 | 5/2000 |
|---|---|---|
| GB | 2 286 437 | 8/1995 |

* cited by examiner

Primary Examiner—Dirk Wright
Assistant Examiner—David D. Le
(74) Attorney, Agent, or Firm—Kenyon & Kenyon LLP

(57) ABSTRACT

A method and device for operating a clutch between an internal combustion engine and at least one driven wheel of a vehicle, a torque being transmitted between the internal combustion engine and the driven wheel by pressing the clutch together via an application force or an application pressure, and the application force or the application pressure being controlled or regulated as a function of the temperature of the clutch.

11 Claims, 10 Drawing Sheets

METHOD AND DEVICE FOR OPERATING A CLUTCH

BACKGROUND INFORMATION

Figure 1:
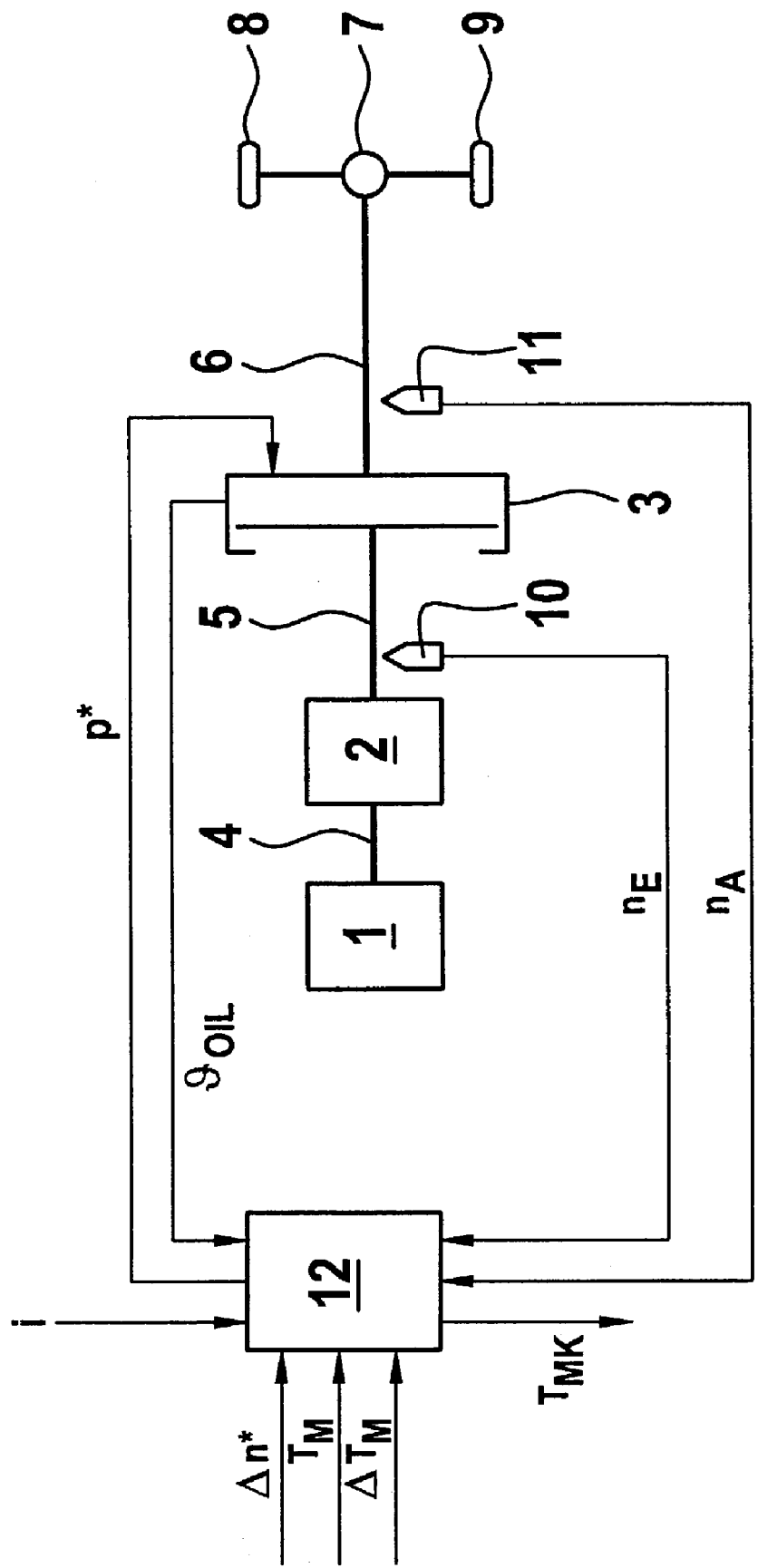

The present invention relates to a method and a device for operating a clutch between an internal combustion engine and at least one driven wheel of a vehicle, a torque being transmitted between the internal combustion engine and the driven wheel by pressing the clutch together via an application force or an application pressure.

If a clutch is operated with slip, it is possible to draw inferences concerning the clutch torque transmitted if the coefficient of friction is known. This torque information is intended to be used to determine the transmission input torque. Precise knowledge of the transmission input torque is of particular significance for continuously variable transmissions (CVT) so that the safety pressure when controlling the belt tension of belt transmissions can be reduced and the transmission efficiency can be increased.

The object of the present invention is to improve the operation of a clutch.

The object is achieved by a method and a device for operating a clutch between an internal combustion engine and at least one driven wheel of a vehicle according to Claim 1 and Claim 8 respectively, a torque being transmitted between the internal combustion engine and the driven wheel to operate a clutch between an internal combustion engine and at least one driven wheel of a vehicle by pressing the clutch together via an application force or an application pressure and the application force or the application pressure being controlled or regulated as a function of the temperature of the clutch.

In an advantageous embodiment of the invention, the application force or the application pressure is controlled or regulated as a function of the temperature of a friction surface of the clutch.

In a further advantageous embodiment of the invention, the application force or the application pressure is controlled or regulated as a function of the temperature of oil used to lubricate or cool the clutch.

In a further advantageous embodiment of the invention, the torque to be transmitted between the internal combustion engine and the driven wheel is increased by a specified value when the temperature of the clutch, the temperature of a friction surface of the clutch or the temperature of oil used to lubricate or cool the clutch exceeds a threshold value.

In a further advantageous embodiment of the invention, the application force or the application pressure is regulated as a function of a clutch slip in the clutch, when the torque is transmitted between the internal combustion engine and the driven wheel, and a setpoint clutch slip, in particular when the temperature of the clutch, the temperature of a friction surface of the clutch or the temperature of oil used to lubricate or cool the clutch is less than or equal to the threshold value.

In a further advantageous embodiment of the invention, the application force or the application pressure is regulated as a function of the difference between the clutch slip and the setpoint clutch slip, in particular when the temperature of the clutch, the temperature of a friction surface of the clutch or the temperature of oil used to lubricate or cool the clutch is less than or equal to the threshold value.

In a further advantageous embodiment of the invention, the application force or the application pressure is regulated by an inverse clutch model which calculates the application force or the application pressure as a function of the torque transmitted via the clutch.

The device according to the present invention for operating a clutch between an internal combustion engine and at least one driven wheel of a vehicle, a torque being transmitted between the internal combustion engine and the driven wheel by pressing the clutch together via an application force or an application pressure, is provided with a pressure regulator to control or regulate the application force or the application pressure as a function of the temperature of the clutch, the temperature of a friction surface of the clutch or the temperature of oil used to lubricate or cool the clutch.

In a further advantageous embodiment of the invention, means are provided to determine the temperature of the clutch, the temperature of a friction surface of the clutch or the temperature of oil used to lubricate or cool the clutch.

In a further advantageous embodiment of the invention, the pressure regulator has a regulator to regulate the application force or the application pressure as a function of a clutch slip in the clutch, when the torque is transmitted between the internal combustion engine and the driven wheel, and a setpoint clutch slip.

In a further advantageous embodiment of the invention, the pressure regulator has an inverse clutch model to calculate the application force or the application pressure as a function of the torque transmitted via the clutch.

In a further advantageous embodiment of the invention, the coefficient of friction of the clutch is a parameter of the inverse clutch model.

In a further advantageous embodiment of the invention, an adapter is provided to adapt the coefficient of friction of the clutch.

Figure 2:
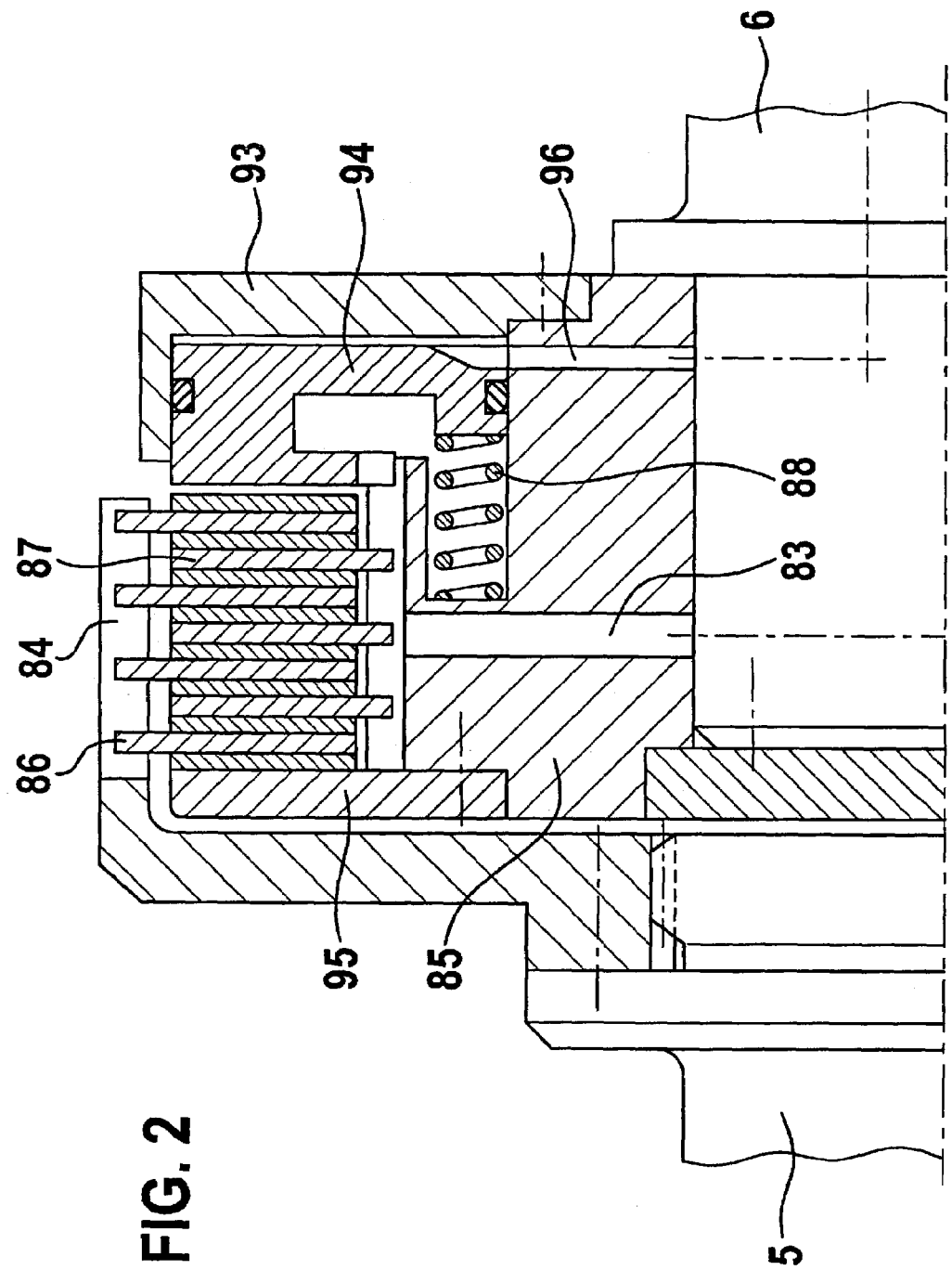
Figure 3:
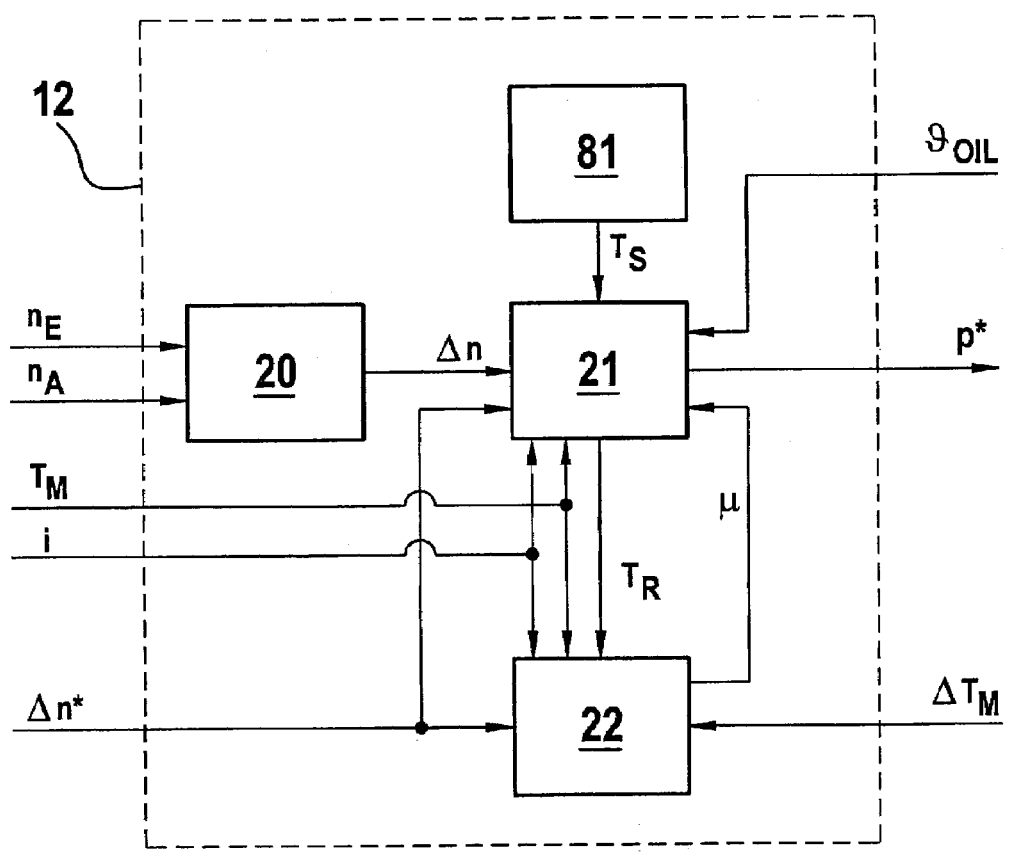
Figure 4:
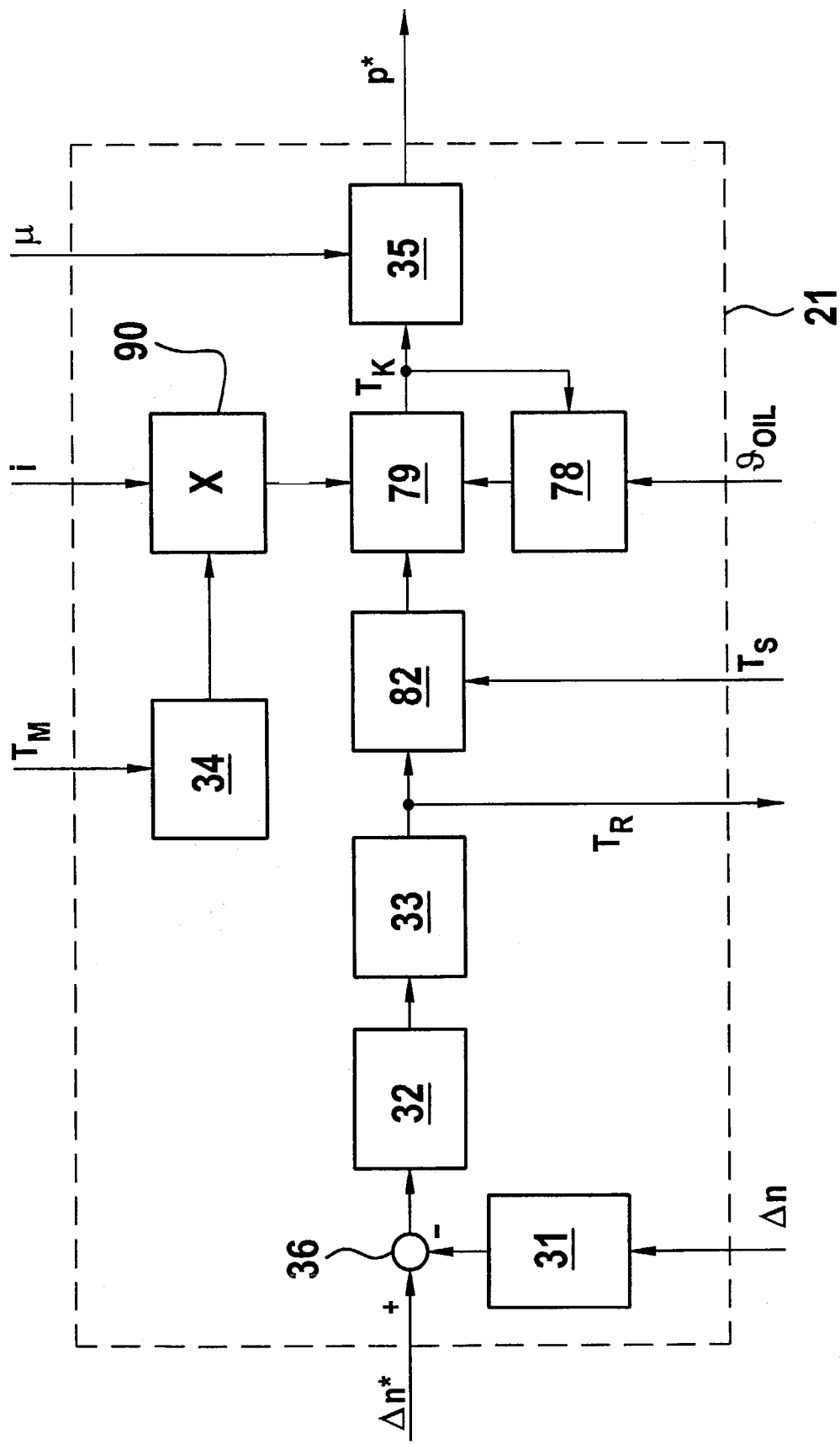
Figure 5:
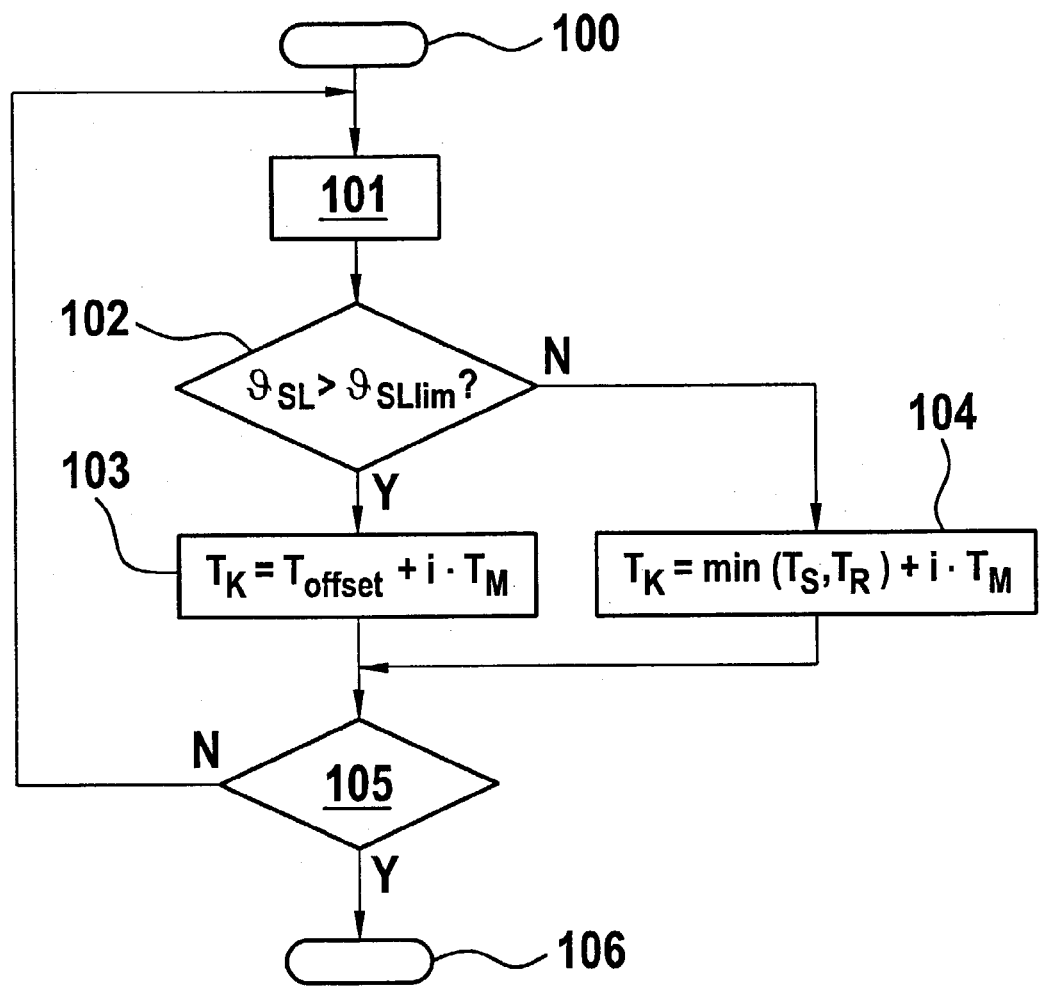
Figure 6:
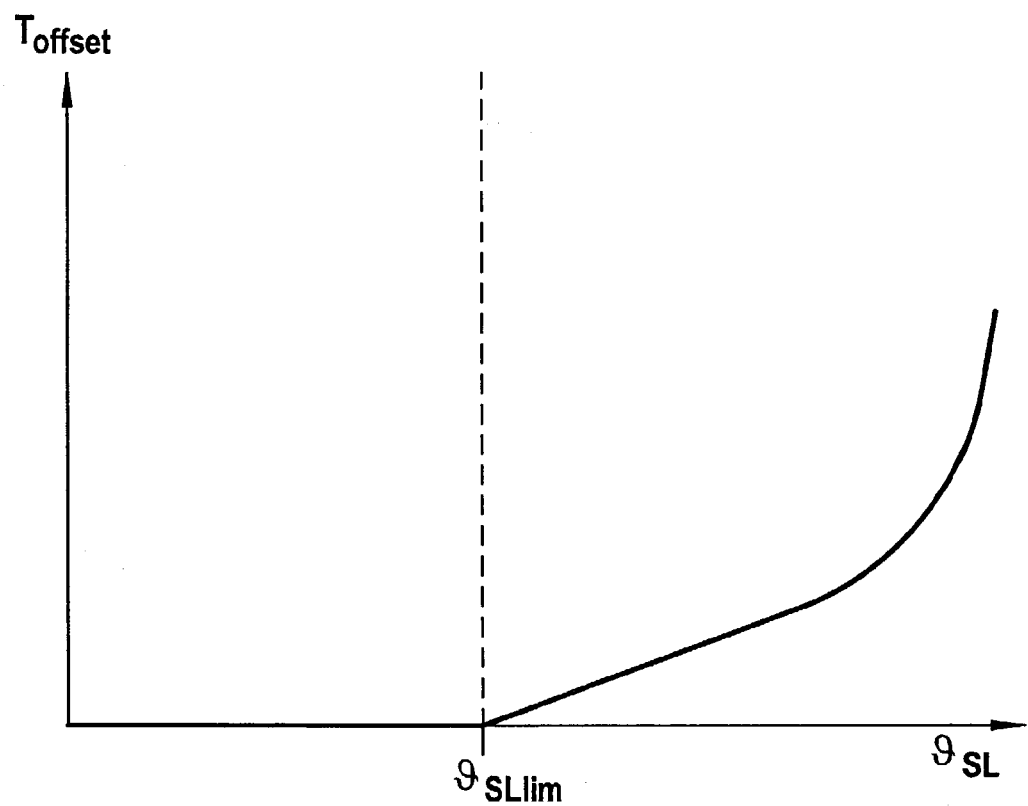
Figure 7:
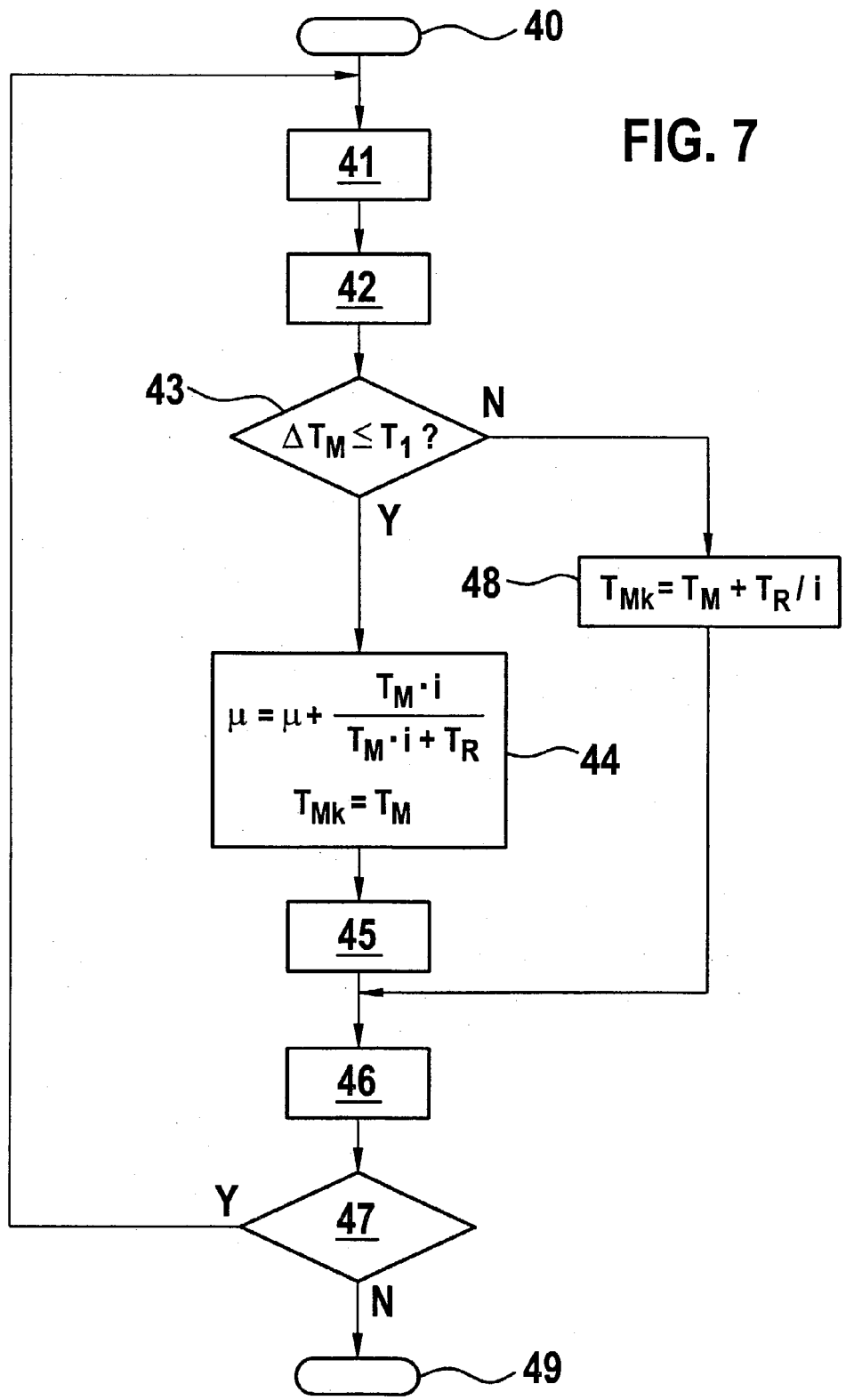
Figure 8:
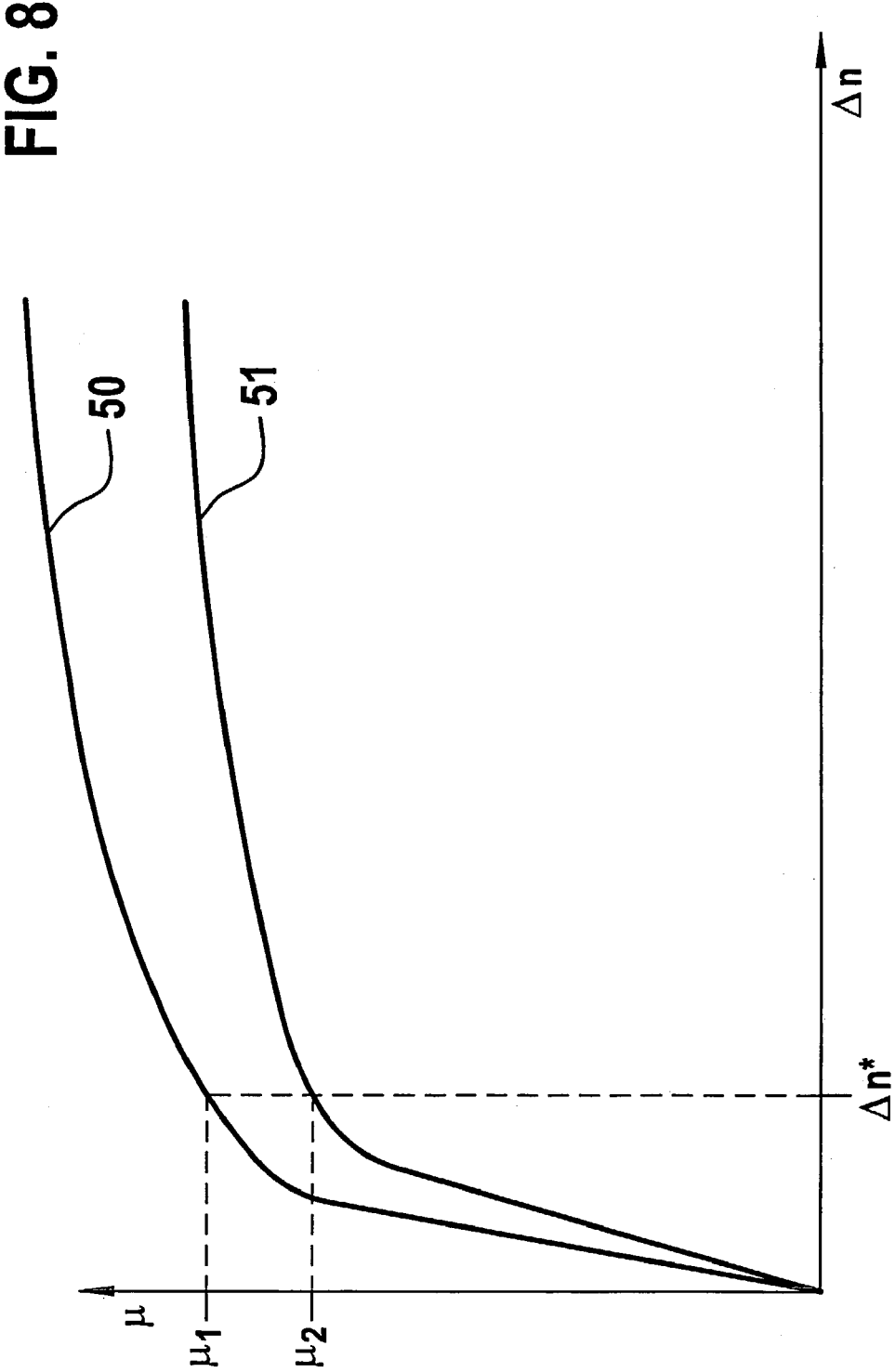
Figure 9:
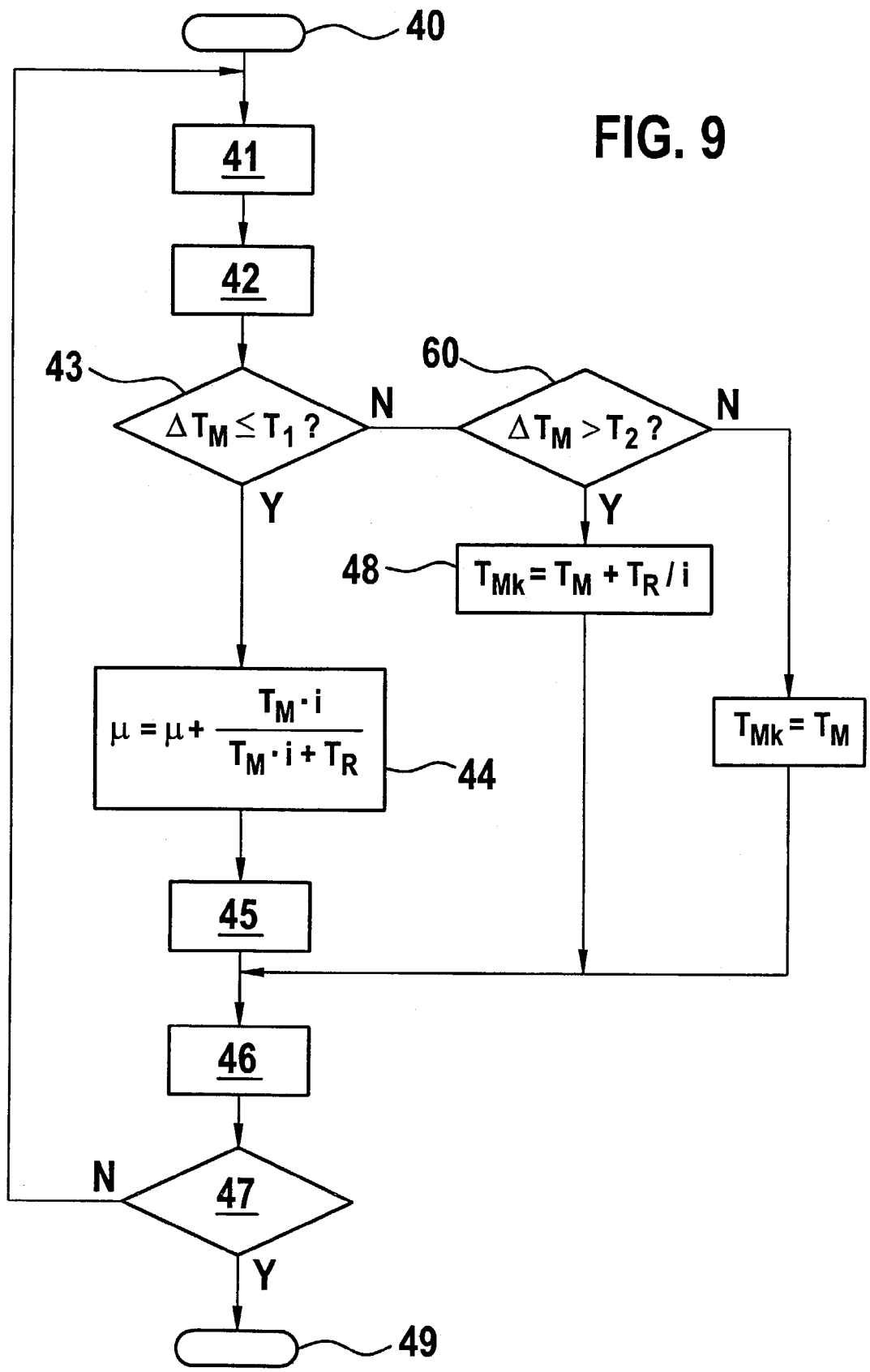
Figure 10:
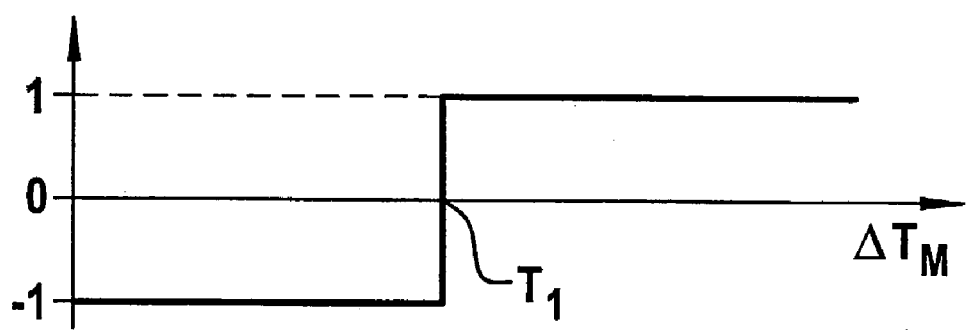
Figure 11:
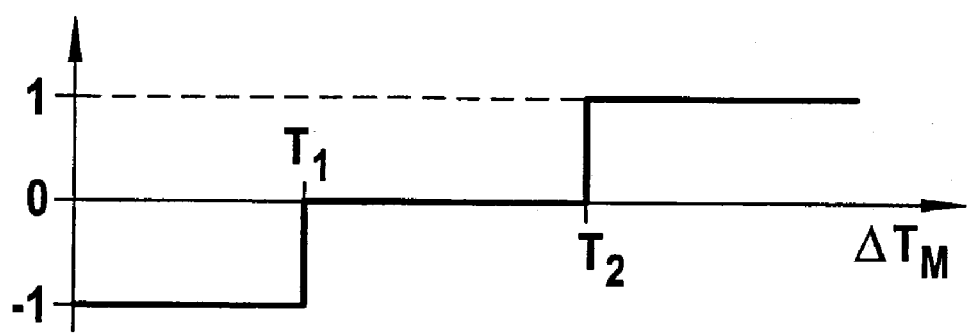

Further details and advantages can found in the following description of exemplary embodiments in which:

FIG. 1 shows a drive unit for a motor vehicle.
FIG. 2 shows a clutch.
FIG. 3 shows a clutch controller.
FIG. 4 shows a pressure regulator.
FIG. 5 shows a flow chart.
FIG. 6 shows a characteristic curve.
FIG. 7 shows a flow chart.
FIG. 8 shows a coefficient of friction-slip characteristic curve.
FIG. 9 shows a flow chart.
FIG. 10 shows an illustration of the flow chart of FIG. 4.
FIG. 11 shows an illustration of the flow chart of FIG. 6.

FIG. 1 shows a drive unit for a motor vehicle. Reference symbol 1 identifies an internal combustion engine which is connected to an automatic transmission 2 via a shaft 4. Automatic transmission 2 is formed in a particularly advantageous manner as a belt transmission. Automatic transmission 2 is connected via a clutch input shaft 5, a clutch 3, a clutch output shaft 6, a differential 7 to driven wheels 8, 9 for the purpose of propelling the motor vehicle. By pressing clutch 3 together with an application pressure p, it is possible to adjust the torque which is transmitted via clutch 3. In order to adjust the torque transmitted via clutch 3, a clutch controller 12 is provided, which by specifying a desired application pressure p*, adjusts the application pressure in clutch 3. The application pressure is synonymous with an application force with which clutch 3 is pressed together.

Input variables in clutch controller 12 include rotational speed $n_E$ of clutch input shaft 5 which is measured by a rotational speed sensor 10, rotational speed $n_A$ of clutch output shaft 6 which is measured by a rotational speed sensor 11, transmission ratio i of automatic transmission 2, an oil temperature $\theta_{OIL}$ of clutch 3 and a desired value $\Delta n^*$ for the clutch slip of clutch 3 (setpoint clutch slip) as well as optionally torque $T_M$ of internal combustion engine 1 as well as information $\Delta T_M$ relating to the inaccuracy of the information relating to torque $T_M$ of internal combustion engine 1. Clutch slip $\Delta n$ is defined as $$\Delta n = n_E - n_A$$

Torque $T_M$ of internal combustion engine 1 and information $\Delta T_M$ relating to the inaccuracy of the information relating to torque $T_M$ of internal combustion engine 1 are provided, for example, by an engine management which is not illustrated.

FIG. 2 shows a clutch 3 in an exemplary embodiment. Reference symbol 83 identifies a lubricating oil supply for hydraulic oil, reference symbol 84 an outer carrier, reference symbol 85 an inner carrier, reference symbol 86 an outer blade, reference symbol 87 an inner blade, reference symbol 88 a restoring spring, reference symbol 93 a cylinder, reference symbol 94 a piston, reference symbol 95 a pressure plate and reference symbol 96 a pressure medium supply. Outer carrier 84, which is connected to clutch input shaft 5, is provided with outer blades 86, and in an advantageous embodiment, with steel blades without a friction lining. Inner carrier 85 which is connected to clutch output shaft 6 accommodates inner blades 87 which are coated with a friction lining. Upon the introduction of hydraulic oil at a defined pressure level via pressure medium supply 96 into cylinder 93, piston 94 moves against the force of restoring spring 88 in the direction of pressure plate 95 and presses together the blade package which include inner and outer blades 87 and 86. In order to cool the blade package, hydraulic oil is directed to inner and outer blades 87 and 86 via lubricating oil supply 83. The temperature of the lubricating oil is supplied to clutch controller 12 as oil temperature $\theta_{OIL}$.

FIG. 3 shows clutch controller 12. It has a subtractor 20 and a pressure regulator 21 as well as optionally an adapter 22 and/or a protection device 81. Pressure regulator 21 is explained in greater detail with reference to FIG. 4 and the adapter with reference to FIG. 7. Subtractor 20 determines clutch slip $\Delta n$, which is the input variable in pressure regulator 21. Additional input variables of pressure regulator 21 include setpoint clutch slip $\Delta n^*$, engine torque $T_M$, transmission ratio i of automatic transmission 2 and coefficient of friction $\mu$. Coefficient of friction $\mu$ is formed by adapter 22. Input variables in optional adapter 22 include setpoint clutch slip $\Delta n^*$, transmission ratio i of automatic transmission 2, torque $T_M$ of internal combustion engine 1, information $\Delta T_M$ relating to the inaccuracy of the information relating to torque $T_M$ of internal combustion engine 1 as well as a differential torque $T_R$ which is formed by pressure regulator 21. In addition to coefficient of friction $\mu$, a corrected engine torque $T_{MK}$ is an additional output variable of adapter 22. Pressure regulator 21 also forms desired application pressure $p^*$.

Clutch controller 12 optionally has a protection device 81 to protect the drive unit, automatic transmission 2 in particular, against torque shocks. A shock torque $T_S$ is an output variable of protection device 81. In an advantageous embodiment, shock torque $T_S$ is calculated according to the following equation $$T_s = T_c - \sum_l J_l \cdot \frac{2\pi \cdot \Delta n_{\max}}{\Delta t}$$

where $J_1$ is the moment of inertia of a 1st component of the drive unit on the side of clutch 3, on which internal combustion engine 1 is arranged.

$\Delta n_{max}$ is the maximum permissible clutch slip $T_c$ is a constant torque $\Delta t$ is the period of time, in which a torque shock leads to an increase in slip.

If the duration of slip $\Delta t$ is of secondary importance, then shock torque $T_S$ may be made equal to constant torque $T_C$.

In an advantageous embodiment, it is possible to transmit shock torque $T_S$ to a transmission controller so that, for example, the application pressure can be increased accordingly in a belt transmission. The application pressure required in the belt transmission is to be increased as a function of shock torque $T_S$.

FIG. 4 shows the internal structure of pressure regulator 21. Pressure regulator 21 has a filter 31 for the purpose of filtering clutch slip $\Delta n$. An adder 36 serves to produce the difference between setpoint clutch slip $\Delta n^*$ and clutch slip $\Delta n$ which is filtered by filter 31. This difference is negated by a negater 32 and is an input variable in a regulator 33, which in an advantageous embodiment, is designed as a PID controller. A differential torque $T_R$ is the output variable of regulator 33. Differential torque $T_R$ is an input variable in a minimum value calculator 82. Minimum value calculator 82 compares differential torque $T_R$ and shock torque $T_S$ and outputs the greater torque as an output value. The minimum of differential torque $T_R$ and shock torque $T_S$ is an input value in a selector 79.

A filter 34 serves to filter engine torque $T_M$ which is multiplied by a multiplier 90 by transmission ratio i of automatic transmission 2. Engine torque $T_M$ which is filtered in this manner and multiplied by transmission ratio i of automatic transmission 2 is sent to a selector 79.

Moreover, a temperature model 78 is provided to calculate temperature $\theta_{SL}$ Of the steel blades of clutch 3. In an exemplary embodiment, the relation $$\vartheta_{SL}(t_n) = \vartheta_{OIL}(t_n) - \int \left( \frac{\pi}{15 \cdot z_R \cdot m_{SL} \cdot c_{SL}} \cdot \left| T_k(t) \cdot (n_E(t_n) - n_A(t_n)) \right| - \alpha \frac{2A_R}{m_{SL} \cdot c_{SL}} (\vartheta_{SL}(t_{n-1}) - \vartheta_{SL}(t_n)) \right) dt$$

is implemented in temperature model 78 where $\theta_{SL}$ is the temperature of the steel blades $\theta_{OIL}$ is the temperature of the hydraulic oil $A_R$ is the friction surface of the steel blades $Z_R$ is the number of friction surfaces $m_{SL}$ is the mass of the steel blades $C_{SL}$ is the heat capacity of the steel blades $t_n$ is the present time $\alpha$ is the heat transmission coefficient Temperature $\theta_{SL}$ of the steel blades of clutch 3 calculated in this manner is an input variable in selector 79. The output variable of selector 79 is clutch torque $T_K$ to be transmitted by clutch 3, which together with coefficient of friction μ, is an input value in an inverse clutch model 35.

FIG. 5 shows a flow chart which in an advantageous embodiment is implemented on selector 79. The start of the sequence 100 is followed by a step 101 in which temperature $\theta_{SL}$ of the steel blades of clutch 3 is input. Step 101 is followed by an interrogation 102 inquiring whether $$\theta_{SL} > \theta_{SLlim}$$

where $\theta_{SLlim}$ is a threshold value for temperature $\theta_{SL}$ of the steel blades of clutch 3. If the condition $$\theta_{SL} > \theta_{SLlim}$$

is met, interrogation 102 is followed by a step 103 in which clutch torque $T_K$ to be transmitted by clutch 3 is calculated according to $$T_K = \min(T_S, T_R) + i \cdot T_M,$$

$T_{offset}$, for example, being determined according to a relation such as is shown, for example, in FIG. 6.

If, however, the condition $$\theta_{SL} > \theta_{SLlim}$$

is not met, interrogation 102 is followed by a step 104 in which clutch torque $T_K$ to be transmitted by clutch 3 is calculated according to $$T_k = \min(T_S, T_R) + i \cdot T_m,$$

Steps 103 and 104 respectively are followed by an interrogation 105 inquiring whether the determination of clutch torque $T_K$ to be transmitted by clutch 3 as a function of the temperature of clutch 3 is to be terminated. If this is not the case, then step 101 follows interrogation 105. If, however, it is the case, the end of the sequence 106 follows interrogation 105.

In inverse clutch model 35, the following equation is implemented in an exemplary embodiment:

$$T_K = T_{offset} + i \cdot T_M \quad p^* = \frac{1}{A_R}\left(\frac{T_K}{\mu \cdot r \cdot Z_R} + F_0\right)$$

A is the piston surface of clutch 3, r the effective friction radius of clutch 3, $Z_R$ the number of friction surfaces of clutch 3 and $F_0$ is the minimum force required for transmitting torque via clutch 3.

FIG. 7 shows a flow chart as an implementation of adapter 22. Reference symbol 40 identifies the start of the sequence and reference symbol 49 the end of the sequence. In step 41, information $T_M$ relating to the engine torque, information $\Delta T_M$ relating to the inaccuracy of the information relating to engine torque $T_M$, differential torque $T_R$, setpoint clutch slip $\Delta n^*$ and application pressure p are input.

In a subsequent step 42, a coefficient of friction μ is formed from setpoint clutch slip $\Delta n^*$ and application pressure p. In an advantageous embodiment, this is achieved by a coefficient of friction-slip characteristic curve which is a function of application pressure p. A characteristic curve of this type is illustrated for example in FIG. 8 and is identified by reference symbol 50.

Step 42 is followed by interrogation 43 inquiring whether $$\Delta T_M \leq T_1$$

where $T_1$ is a (first) tolerance value. If $$\Delta T_M \leq T_1$$

then step 44 follows in which a new coefficient of friction μ of the clutch is formed according to $$\mu = \mu + \frac{T_M \cdot i}{T_M \cdot i + T_R}$$

and a corrected engine torque $T_{MK}$ is formed according to $$T_{MK} = T_M$$

Step 44 is followed by step 45 in which the coefficient of friction-slip characteristic curve 50 as a function of the application pressure is modified in such a manner that the new value for coefficient of friction μ and setpoint clutch slip $\Delta n^*$ form a pair of variates on modified coefficient of friction-slip characteristic curve 51. Step 45 is illustrated in FIG. 8. Reference symbol $\mu_1$ identifies the value for coefficient of friction μ for the relevant application pressure prior to execution of step 45 and $\mu_2$ identifies the value of coefficient of friction μ for the relevant application pressure after execution of step 45. Coefficient of friction $\mu_1$ is formed by characteristic curve 50 as a function of setpoint clutch slip $\Delta n^*$ (see step 42). In step 45, coefficient of friction-characteristic curve 50 is modified in such a manner that a coefficient of friction-clutch slip characteristic curve 51 is produced, on which value $\mu_2$ and setpoint clutch slip $\Delta n^*$ are a pair of variates.

If $$\Delta T_M \leq T_1$$

is not fulfilled, then instead of step 44, step 48 follows in which a corrected engine torque $T_{MK}$ is equated to the sum of engine torque $T_M$ generated by internal combustion engine 1 and differential torque $T_R$ which is divided by transmission ratio i of automatic transmission 2:

$$T_M = T_M + T_R/i$$

Step 46 or 48, respectively, is followed by an interrogation 47 inquiring whether the preceding sequence is to be repeated. If this is the case, then step 41 follows. If this is not the case, the sequence is terminated.

FIG. 9 shows a modification of the flow chart of FIG. 7. Interrogation 43 is not followed by step 48 but rather by an interrogation 60. Interrogation 60 inquires whether $$\Delta T_M > T_2$$

is fulfilled, $T_2$ being a second tolerance value. If this condition is fulfilled, then step 48 follows. However if the condition is not met, step 46 is performed.

FIGS. 10 and 11 illustrate the differences between the flow charts as shown in FIG. 7 and FIG. 9. Information $\Delta T_M$ relating to the inaccuracy of the information relating to engine torque $T_M$ of internal combustion engine 1 is shown on the X-axis. The Y-axis in FIG. 10 and FIG. 11 indicates which steps are executed. The value −1 symbolizes the execution of steps 44 and 45, the value 1 symbolizes the execution of step 48 and the value 0 represents neither the execution of steps 44 and 45 nor of step 48. Interrogation 43 in FIG. 7 corresponds to a binary switch. The combination of interrogations 43 and 60 in FIG. 9 corresponds to a three-point switch. Instead of these two straightforward switch types, it is naturally also feasible to perform complicated switching procedures, such as flowing transitions, which can be performed, e.g., by fuzzy techniques.

LIST OF REFERENCE SYMBOLS

1 engine
2 automatic transmission
3 clutch
4 shaft
5 clutch input shaft
6 clutch output shaft
7 differential
8, 9 drive wheels
10, 11 rotational speed sensors
12 clutch controller
20 subtractor
21 pressure regulator
22 adapter
31, 34 filter
32 negater
33 regulator
35 inverse clutch model
36 adder
40, 100 start of the sequence
41, 42, 44, step
45, 46, 48
101, 103,
104
43, 47, 60 interrogation
102, 105
49 end of the sequence
50, 51 coefficient of friction-slip characteristic curve
78 temperature model
79 selector
81 protection device
82 minimum value calculator
83 lubricating oil supply
84 outer carrier
85 inner carrier
86 outer blade
87 inner blade
88 restoring spring
90 multiplier
93 cylinder
94 piston
95 pressure plate
96 pressure medium supply
$n_E$ rotational speed of the clutch input shaft
$n_A$ rotational speed of the clutch output shaft
$T_M$ information relating to the engine torque
$\Delta T_M$ inaccuracy of the information relating to the engine torque
$T_R$ differential torque (regulator output)
$T_K$ clutch torque
$T_1$ first tolerance value
$T_2$ second tolerance value
$\Delta n$ clutch slip
$\Delta n^*$ setpoint clutch slip
i transmission ratio of the transmission
p application pressure
p* desired application pressure
$\mu, \mu_1, \mu_2$ coefficient of friction
$J_1$ moment of inertia of the drive unit on the side of clutch 1, on which the internal combustion engine is arranged.

$\Delta n_{max}$ maximum permissible clutch slip
$T_c$ constant torque
$\Delta t$ time period in which a torque shock causes an increase in slip
$\theta_{SL}$ temperature of the steel blades of the clutch
$\theta_{SLlim}$ threshold value for the temperature of the steel blades of the clutch
$\theta_{OIL}$ Temperature of the hydraulic oil
$A_R$ friction surface of the steel blades of the clutch
$Z_R$ number of friction surfaces of the clutch
$m_{SL}$ mass of the steel blades of the clutch
$C_{SL}$ heat capacity of the steel blades of the clutch
$t_n$ present time
$\alpha$ heat transmission coefficient
$F_0$ minimum force required for transmitting torque via the clutch
$T_s$ shock torque
$T_{offset}$ no identification

The invention claimed is:

1. A method for operating a clutch between an internal combustion engine and at least one driven wheel of a vehicle, comprising:
transmitting a torque between the internal combustion engine and the driven wheel by pressing the clutch together via one of an application force and an application pressure; and
controlling one of the application force and the application pressure as a function of a temperature of the clutch by using a temperature model that is stored in memory and corresponds to a mathematical relationship for calculating the temperature of the clutch, wherein one of the application force and the application pressure is controlled as a function of a difference between a clutch slip and a setpoint clutch slip, when one of the temperature of the clutch, a temperature of a friction surface of the clutch and a temperature of an oil used to one of lubricate and cool the clutch is one of less than and equal to a threshold value.

2. The method according to claim 1, wherein one of the application force and the application pressure is controlled as a function of a temperature of a friction surface of the clutch.

3. The method according to claim 1, wherein one of the application force and the application pressure is controlled as a function of a temperature of an oil used to one of lubricate and cool the clutch.

4. The method according to claim 1, wherein the torque to be transmitted between the internal combustion engine and the driven wheel is increased by a specified value when one of the temperature of the clutch, a temperature of a friction surface of the clutch and a temperature of an oil used to one of lubricate and cool the clutch exceeds a threshold value.

5. The method according to claim 1, wherein one of the application force and the application pressure is controlled as a function of a clutch slip in the clutch, when the torque is transmitted between the internal combustion engine and the driven wheel, and given a setpoint clutch slip, and when one of the temperature of the clutch, a temperature of a friction surface of the clutch and a temperature of an oil used to one of lubricate and cool the clutch is one of less than and equal to a threshold value.

6. A method for operating a clutch between an internal combustion engine and at least one driven wheel of a vehicle, comprising:
transmitting a torque between the internal combustion engine and the driven wheel by pressing the clutch together via one of an application force and an application pressure; and controlling one of the application force and the application pressure as a function of a temperature of the clutch by using a temperature model that is stored in memory and corresponds to a mathematical relationship for calculating the temperature of the clutch, wherein one of the application force and the application pressure is regulated by an inverse clutch model which calculates one of the application force and the application pressure as a function of the torque transmitted via the clutch.

7. A system for operating a clutch between an internal combustion engine and at least one driven wheel of a vehicle, comprising:
 means for transmitting a torque between the internal combustion engine and the driven wheel by pressing the clutch together via one of an application force and an application pressure; and
 a pressure regulator for controlling one of the application force and the application pressure on the basis of a temperature model for calculating a temperature of the clutch by taking into account at least one of a temperature of a friction surface of the clutch and a temperature of an oil used to one of lubricate and cool the clutch, wherein:
 the pressure regulator includes a regulator to control one of the application force and the application pressure as a function of a clutch slip in the clutch, when the torque is transmitted between the internal combustion engine and the driven wheel, and a setpoint clutch slip, and
 the pressure regulator includes an inverse clutch model to calculate one of the application force and the application pressure as a function of the torque transmitted via the clutch.

8. The device according to claim 7, further comprising:
 an arrangement for determining at least one of the temperature of the clutch, the temperature of the friction surface of the clutch and the temperature of the oil used to one of lubricate and cool the clutch.

9. The device according to claim 7, wherein the pressure regulator includes a selector for deciding, as a function of at least one of the temperature of the clutch, a temperature of a friction surface of the clutch and a temperature of an oil used to lubricate the clutch, as to whether one of the application force and the application pressure is determined independently of the clutch slip in the clutch.

10. The device according to claim 7, wherein a coefficient of friction ($\mu$) of the clutch is a parameter of the inverse clutch model.

11. The device according to claim 10, further comprising:
 an adapter to adapt the coefficient of friction ($\mu$) of the clutch.

* * * * *

UNITED STATES PATENT AND TRADEMARK OFFICE
CERTIFICATE OF CORRECTION

PATENT NO. : 7,077,783 B2
APPLICATION NO. : 10/130242
DATED : July 18, 2006
INVENTOR(S) : Karl-Heinz Senger et al.

It is certified that error appears in the above-identified patent and that said Letters Patent is hereby corrected as shown below:

On The Title Page (57) ABSTRACT

Line 3, change "a vehicle, a torque being transmitted" to --a vehicle are provided. A torque is transmitted--

Line 6, change "pressure, and the application force" to --pressure. The application force --

Line 7, change "being controlled" to --is controlled--

Column 1, line 4, change "BACKGROUND INFORMATION" to --FIELD OF THE INVENTION--

Column 1, line 8, change "of a vehicle, a torque being" to --of a vehicle; a torque is--

Column 1, line 12, insert heading --BACKGROUND INFORMATION--

Column 1, line 17, delete "particular"

Column 1, line 19, change "can be reduced" to --may be reduced--

Column 1, line 20, change "can be increased" to --may be increased--

Column 1, line 22, change "The object" to --Rt is an object--

Column 1, line 24, change "The object" to --This object--

Column 1, lines 26-27, delete "according to Claim 1 and Claim 8 respectively,--

Column 1, line 26, change "of a vehicle" to --of a vehicle;--

Column 1, line 27, change "torque being transmitted" to --torque is transmitted--

Column 1, line 33, change "being controlled" to --is controlled--

Column 1, line 35, change "In an advantageous embodiment of the invention" to --In an example embodiment of the present invention--

Column 1, line 39, change "advantageous embodiment of the invention" to

UNITED STATES PATENT AND TRADEMARK OFFICE
CERTIFICATE OF CORRECTION

PATENT NO. : 7,077,783 B2
APPLICATION NO. : 10/130242
DATED : July 18, 2006
INVENTOR(S) : Karl-Heinz Senger et al.

It is certified that error appears in the above-identified patent and that said Letters Patent is hereby corrected as shown below:

Column 1, line 43, change "advantageous embodiment of the invention" to --example embodiment of the present invention--

Column 1, line 49, change "advantageous embodiment of the invention" to --example embodiment of the present invention--

Column 1, line 54, change " in particular" to --e.g.,--

Column 1, line 59, change "advantageous embodiment of the invention" to --example embodiment of the present invention--

Column 1, line 62, change " in particular" to --e.g.,--

Column 1, line 66, change "advantageous embodiment of the invention" to --example embodiment of the present invention--

Column 2, lines 6-7, change "a torque being transmitted" to --where a torque is transmitted--

Column 2, line 15, change "advantageous embodiment of the invention" to --example embodiment of the present invention--

Column 2, line 16, change "means are provided" to --an arrangement is provided--

Column 2, line 19, change "advantageous embodiment of the invention" to --example embodiment of the present invention--

Column 2, line 25, change "advantageous embodiment of the invention" to --example embodiment of the present invention--

Column 2, line 26, change "pressure regulator has" to --pressure regulator includes--

Column 2, line 29, change "advantageous embodiment of the invention" to --example embodiment of the present invention--

Column 2, line 32, change "advantageous embodiment of the invention" to --example embodiment of the present invention--

UNITED STATES PATENT AND TRADEMARK OFFICE
CERTIFICATE OF CORRECTION

| | | |
|---|---|---|
| PATENT NO. | : 7,077,783 B2 | |
| APPLICATION NO. | : 10/130242 | |
| DATED | : July 18, 2006 | |
| INVENTOR(S) | : Karl-Heinz Senger et al. | |

It is certified that error appears in the above-identified patent and that said Letters Patent is hereby corrected as shown below:

Column 2, line 35, change "advantageous can be found" to --advantageous may be found--

Column 2, line 36, change "of exemplary embodiments in which" to --of example embodiments.--

Column 2, line 37, insert heading --BRIEF DESCRIPTION OF THE DRAWINGS--

Column 2, line 48, insert heading --DETAILED DESCRIPTION--

Column 2, lines 52-53, delete "in a particularly advantageous manner"

Column 3, lines 14-15, change "management which is not illustrated." to --management.--

Column 3, line 16, change "an exemplary embodiment" to --an example embodiment--

Column 3, lines 26-27, change "an advantageous embodiment" to --an example embodiment--

Column 3, line 41, change "It has a subtractor" to --It includes a subtractor--

Column 3, line 62, change "has a protection device" to --includes a protection device--

Column 3, lines 63-64, change "drive unit, automatic transmission 2, in particular," to --drive unit, e.g., automatic transmission 2,--

Column 3, line 65, delete "advantageous"

Column 4, line 11, change "engine 1 is arranged" to --engine 1 is arranged,--

Column 4, line 12, change "clutch slip" to --clutch slip,--

Column 4, line 13, change "constant torque" to --constant torque, and--

Column 4, line 18, change "an advantageous embodiment" to --an example embodiment--

Column 4, line 20, change "can be increased" to --may be increased--

UNITED STATES PATENT AND TRADEMARK OFFICE
CERTIFICATE OF CORRECTION

PATENT NO. : 7,077,783 B2
APPLICATION NO. : 10/130242
DATED : July 18, 2006
INVENTOR(S) : Karl-Heinz Senger et al.

It is certified that error appears in the above-identified patent and that said Letters Patent is hereby corrected as shown below:

Column 4, line 30, change "advantageous embodiment is designed as" to --example embodiment is configured as--

Column 4, line 46, change "exemplary embodiment," to --example embodiment--

Column 4, line 56, change "the steel blades" to --the steel blades,--

Column 4, line 57, change "the hydraulic oil" to --the hydraulic oil,--

Column 4, line 58, change "the steel blades" to --the steel blades,--

Column 4, line 59, change "of friction surfaces" to --of friction surfaces,--

Column 4, line 60, change "the steel blades" to --the steel blades,--

Column 4, line 61, change "the steel blades" to --the steel blades,--

Column 4, line 62, change "the present time" to --the present time, and--

Column 4, line 63, change "transmission coefficient" to --transmission coefficient.--

Column 5, line 6, change "in an advantageous" to --in an example--

Column 5, lines 20-22, change "according to $T_K = \min(T_S, T_R) + i \cdot T_M$," to --according to $T_K = T \text{ offset} + i \cdot T_M$--

Column 5, line 24, change "being determined" to --is determined--

Column 5, line 42, change "an exemplary embodiment:" to --an example embodiment:--

Column 5, line 46, delete "$T_K = T \text{ offset} + i \cdot T_M$"

UNITED STATES PATENT AND TRADEMARK OFFICE
CERTIFICATE OF CORRECTION

PATENT NO. : 7,077,783 B2
APPLICATION NO. : 10/130242
DATED : July 18, 2006
INVENTOR(S) : Karl-Heinz Senger et al.

It is certified that error appears in the above-identified patent and that said Letters Patent is hereby corrected as shown below:

Column 5, line 63, change "an advantageous embodiment" to --an example embodiment--

Signed and Sealed this

Twelfth Day of June, 2007

JON W. DUDAS
*Director of the United States Patent and Trademark Office*